United States Patent Office 3,265,758

Patented August 9, 1966

3,265,758

LOW MOLECULAR WEIGHT POLYMERS

Edward A. Hedman, Harrison, N.Y., and Curtis W. Ogren, Louisville, Ky., assignors to The Richardson Company, Melrose Park, Ill., a corporation of Ohio No Drawing. Filed Mar. 6, 1963, Ser. No. 263,133
3 Claims. (Cl. 260—680)

This invention is concerned with polymerization reactions involving the "Alfin" catalyst and, more particularly, relates to new low molecular weight polymers obtained from butadiene-1,3.

Alkali metal-catalyzed polymerization of conjugated, unsaturated diolefins, such as isoprene, butadiene-1,3 and similar compounds, is well known to the art and is is generally accepted method of producing synthetic elastomers as well as low molecular weight products. One of the more common alkali metal catalysts is sodium. Production of polymers from unsaturated monomers with a sodium catalyst usually involves extended periods, frequently of the order of a day or longer.

A new type of catalyst, developed by Avery A. Morton, has shown special ability to catalyze certain polymerization reactions and, particularly, the polymerization of butadiene-1,3 to high molecular weight elastomers within a relatively short time.

This new catalyst, identified as the "Alfin" catalyst, has effectively polymerized butadiene in a matter of minutes, producing polymers which have considerably higher molecular weights than have hereto been attained using the commonly accepted sodium or other alkali metal catalyst. The Alfin catalyst has been described in a number of publications, including Morton et al., J. Amer. Chem. Soc. 69,950 (1947) and Morton, The Alfin Reagent, Advances in Catalysis, volume IX, (1957).

The present invention has as one of its primary objects the production of new low molecular weight liquid polymers of butadiene having particular ability for use in forming films, coatings, and adhesives.

Another object is the provision of a process for producing new low molecular weight liquid polymers of butadiene using an Alfin catalyst.

A further object is to provide a process of the foregoing type which will result in reasonably high yields of the new polymers.

It is believed that the unique polymerization induced by the Alfin catalyst is a result of a specific adsorption on the surface of the catalyst, whereby the molecules are both concentrated and oriented. Somewhat similar results have been attained, in some instances, by the use of very high pressures which, in effect, serve to concentrate the molecules for polymerization.

The Alfin catalyst is a complex mixture of organo-alkali metal compounds, normally alkenyls and alkoxides, with an alkali metal halide. Generally, the catalyst comprises alkali derivatives of a secondary alcohol and an aliphatic olefin in combination with alkali halide. A particular catalyst found to be highly effective in polymerization of butadiene comprises a mixture of allyl sodium, sodium isopropoxide and sodium chloride. Such a catalyst may be prepared by first forming amylsodium from amyl chloride and sodium, followed by adding isopropyl alcohol, in stoichiometric amounts, until a predetermined portion of the amylsodium is converted to sodium isopropoxide. Propylene gas is then passed into the mixture, reacting with the remainder of the amylsodium to form allyl sodium. The sodium chloride resulting from the reaction is bound up in the resulting insoluble aggregate catalyst.

Other Alfin catalysts have also been suggested which may be considered as variations of the foregoing. Thus, benzyl sodium may be used in place of allyl sodium, the final complex being formed by introducing toluene rather than propylene into the intermediate sodium amyl isopropoxide mixture. As an alternate, the intermediate mixture may be first treated with propylene and then with toluene. Further, in addition to isopropyl alcohol, other secondary alcohols, having a methyl group joined to the carbon atom containing the hydroxyl group, may, likewise, be used to initially react with the sodium amyl to produce a sodium alkoxide in the intermediate mixture, for example, methyl ethyl carbinol.

The secondary alcohol primarily should be one having the following general formula:

$$CH_3-\underset{\displaystyle OH}{\underset{|}{C}}H-R$$

wherein R may be a saturated alkyl group, such as a methyl, ethyl or propyl group. Cyclohexanol, a secondary alcohol, may also be used.

Polymerization of butadiene in the presence of most Alfin catalysts results in the formation of a predominantly linear chain polymer with no appreciable side chains and, as indicated, a high molecular weight product having considerable tensile strength. Average molecular weights are of the order of five million and may extend up to fifteen million. Due to the difficulty of accurately determining molecular weights in this range, such elastomers are frequently characterized by their dilute solution viscosities (DSV), a commonly accepted technique, further defined hereinafter. Approximately seventy-five percent of the elastomeric polybutadienes, obtained with an Alfin catalyst, have been determined to be of the trans-1,4 isomer variety as distinguished from those made by means of the normal sodium catalyst type reaction which results, primarily, in a 1,2-isomer polymerization product.

It has now been discovered that by using a special type of Alfin catalyst low molecular weight liquid polymers of butadiene may be obtained. More particularly, the Alfin catalyst contemplated by this invention is a complex comprising an alkali alkoxide, xylyl alkali and alkali halide.

As indicated above, the most common Alfin catalyst is obtained by initially preparing an amylsodium from amyl chloride followed by reacting a part of the amylsodium with a secondary alcohol and the remainder with an aliphatic olefin. Modified catalysts have been formed by substituting toluene for propylene. However, substituting one of the xylenes, such as ortho, meta or para xylene, for the propylene appears to produce an unique catalyst having a marked effect on the polymerization of butadiene. Such a modified catalyst has been found to affect the polymerization reaction to the extent that low polymer liquid forms of polybutadiene are obtained rather than high molecular weight elastomers.

The molecular weights of the polybutadiene obtained by the modified Alfin catalyst contemplated are generally of the order of 100–2000 and have dilute solution viscosities within the range of about .05–.12.

An exemplary Alfin catalyst contemplated is formed by first reacting three moles of sodium with one and one-half moles of amyl chloride. Isopropanol, in predetermined mole quantities, is then reacted with the amylsodium, exemplary isopropanol quantities being 0.75, 0.83 and 1.00 moles. The presently preferred mole quantity for isopropanol is between 0.40–0.80. Xylene, preferably in excess, is then reacted with the remaining unreacted amylsodium. The ratio of sodium alkoxide to xylylsodium, for example, in the preferred Alfin catalyst complex used for polymerization can be varied; however, yields and molecular weights will vary, with corresponding variance in properties of the polymer. The preferred ratio of xylylsodium to sodium isopropoxide in the catalyst is between 0.87 to 2.75.

In making elastomeric copolymers, the butadiene is preferably passed through or contacted with purifying agents where possible to remove water, inhibitors and other impurities which may affect the reaction or the catalyst. The monomer is then dissolved in an inert hydrocarbon solvent, such as pentane, hexane or heptane. Additionally, xylene should also be present in the reaction mixture, preferably in the mole ratio of about 0.5 to 1.5 based on the moles of butadiene to be polymerized. The excess xylene may be incorporated at the time of preparing the catalyst or, alternately, added to the reaction mixture prior to polymerization.

After forming a solution of the monomer, the Alfin catalyst, as a suspension in the same or a compatible inert hydrocarbon solvent, is added in desired quantities. The reaction normally begins immediately, with an elevation in temperature from the presently preferred minimum starting temperature of about 25° C. As the reaction is customarily conducted in a confined atmosphere, pressures within the reaction vessel will usually also rise somewhat. The reaction is completed within a relatively short period, normally in about an hour, resulting in a fluid to a somewhat viscous syrupy product. An alternate and sometimes preferred process comprises adding a solution of the monomer dissolved in the solvent to a suspension of the catalyst. This alternate process frequently results in a more homogeneous product and higher yields.

Yields generally have been found to be of the order of 75% or more based on the original monomer. Additionally, infrared analysis indicates trans olefinic unsaturation to vinyl unsaturation in a ratio of about 1.5 to 3.0 with a small or insignificant amount (less than 10%) of cis unsaturation.

Following is an example of the formation of a low molecular weight butadiene polymer.

An o-xylylsodium Alfin catalyst —1½ liter pentane suspension is prepared using 3-gram atoms of sodium sand and 1.5 moles of amyl chloride. The amylsodium is first reacted with 0.42 gram moles of isopropanol followed by subjecting the intermediate catalyst to an excess of the 1.08 moles of o-xylene stoichiometrically required.

A mixture of 24.5 grams of o-xylene, 50 ml. of pentane and 25.5 grams of butadiene are treated with 30 ml. of the above catalyst. Within about an hour the polymerization is complete with a yield of about 82% of a viscous sticky liquid soluble in pentane and with a DSV of about 0.06.

The dilute solution viscosity of the polymers is determined by the following formula:

$$\mathrm{DSV}=\frac{2.303 \log \frac{t}{t_0}}{\text{grams elastomer/100 cc. of solution}}$$

wherein $t$ is the flow time of the elastomer is a selected solvent using an Ostwald viscosimeter and $t_0$ is the flow time of the solvent.

In determining DSV of the present compositions, samples of the Alfin catalyzed polymer are suspended in 100 ml. of benzene to produce a saturated solution having a concentration of about 0.1–0.2 percent, which is filtered prior to viscosity measurement. Concentrations of the elastomer in the solvent are determined by evaporating aliquot portions of the solution.

Infra-red analysis may be conducted in a Perkin-Elmer Model 21 recording spectrophotometer wherein samples are retained in a 1 mm. salt block cell. Absorptions at wave lengths of 10.34 and 10.98 microns are compared using Beer's law to analyze the data developed.

The pentane soluble polymers, when tested in various coating formulations containing cobalt, manganese and lead napthenate driers and either toluene or mineral spirits as a solvent, will be found to form relatively hard films when air dried for several days or baked at temperatures of 400° F. for 15 minutes. These films are resistant to 10% sodium chloride solution, ethanol, methyl ethyl ketone and trichloroethylene.

Having described the invention and an exemplary embodiment thereof, the same is only intended to be limited by the scope of the following claims:

We claim:

1. A process of preparing a low molecular weight polybutadiene which comprises subjecting butadiene in the presence of a xylene to the action of a catalyst complex consisting essentially of a sodium isopropoxide, xylylsodium and sodium chloride.

2. A process as described in claim 1 wherein the mole ratio of xylylsodium to sodium isopropoxide in said catalyst is between .87 to 2.75.

3. A process as described in claim 2 wherein the xylene is ortho xylene.

References Cited by the Examiner

UNITED STATES PATENTS

| | | | |
|---|---|---|---|
| 2,631,175 | 3/1953 | Crouch | 260—680 |
| 2,841,574 | 7/1958 | Foster | 260—94.2 |
| 3,067,187 | 12/1962 | Greenberg et al. | 260—94.2 |

FOREIGN PATENTS

| | | |
|---|---|---|
| 626,760 | 9/1961 | Canada. |

DELBERT E. GANTZ, *Primary Examiner.*

R. H. SHUBERT, *Assistant Examiner.*